United States Patent [19]

Guagliardo

[11] 4,423,179

[45] Dec. 27, 1983

[54] DIMER ACID BASED POLYURETHANE COATING COMPOSITIONS

[75] Inventor: Matthew Guagliardo, Bloomfield, N.J.

[73] Assignee: Inmont, Clifton, N.J.

[21] Appl. No.: 476,951

[22] Filed: Mar. 21, 1983

Related U.S. Application Data

[63] Continuation-in-part of Ser. No. 306,817, Sep. 29, 1981, abandoned.

[51] Int. Cl.$^3$ .......................... C09D 3/52; C09D 3/72
[52] U.S. Cl. .................................... 524/539; 525/440; 525/443; 528/44; 528/84; 528/85; 528/295.3
[58] Field of Search ............... 524/539; 525/440, 443; 528/44, 84, 85, 295.3

[56] References Cited

U.S. PATENT DOCUMENTS

| | | | |
|---|---|---|---|
| 2,429,219 | 10/1947 | Cowan et al. | 528/295.3 |
| 3,267,080 | 8/1966 | Kamal | 528/85 |
| 3,383,343 | 5/1968 | Mohajer et al. | 528/295.3 |
| 3,578,612 | 5/1971 | Burba et al. | 528/85 |
| 3,954,899 | 5/1976 | Chang et al. | 525/520 |
| 4,045,431 | 8/1977 | Fagerburg | 528/295.3 |
| 4,096,102 | 6/1978 | Strauss et al. | 528/295.3 |
| 4,155,889 | 5/1979 | Fagerburg et al. | 528/295.3 |
| 4,225,645 | 9/1980 | Mao et al. | 524/590 |
| 4,352,924 | 10/1982 | Wooten et al. | 525/443 |

*Primary Examiner*—Ronald W. Griffin
*Attorney, Agent, or Firm*—Michael R. Chipaloski

[57] ABSTRACT

Water-borne and solvent-borne storage stable polyurethane coatings having improved flexibility and solvent resistance are obtained from a hydroxyl-containing polyester based on dimer acid and a diisocyanate resin. These compositions are storage stable and when cured with an amine aldehyde resin form very durable and highly extensible coatings. These compositions are especially useful in paint compositions wherein the paint compositions are applied to extensible, resilient, rubbery substrates and metal substrates.

17 Claims, No Drawings

DIMER ACID BASED POLYURETHANE COATING COMPOSITIONS

CROSS-REFERENCE TO RELATED APPLICATION

This is a continuation-in-part of application Ser. No. 306,817, filed Sept. 29, 1981, being abandoned Apr. 4, 1983.

BACKGROUND OF THE INVENTION

1. Field of the Invention

This invention relates to the field of urethane coatings of the type formed by reacting a hydroxyl terminated polyester with a polyfunctional isocyanate. The invention lies in the discovery that an improved coating can be obtained by using $C_{36}$ dicarboxylic (dimer) acids as the major component instead of short chain acids to form the polyester reactant.

The urethane coatings produced by reaction of a polyester and a polyisocyanate are especially useful as binders in paint compositions where good appearance must be maintained over long periods of time despite exposure to weather and various forms of attack during use such as on automobiles. Paint compositions containing the polyurethane compositions of the present invention as binders are especially useful on rubbery, resilient materials and for areas which are subject to mechanical shock such as automobile bumpers and moldings, exposed corners and surfaces of car doors and the like.

2. Description of the Prior Art

The use of polyurethane coatings, having a high degree of extensibility, to coat automobile parts is known in the art. For example, U.S. 3,954,899 discloses a coating which comprises a hydroxyl-containing urethane reaction product containing a polyester component. The polyester component comprises an acid component of a monomeric carboxylic acid or anhydride having 2-14 carbon atoms. Cured coatings of this type are claimed to be extensible and useful on rubbery and soft material. It has now been found that by using dimer acids as the acid component of the polyester component, that a polyurethane can be produced that exhibits superior gasoline and oil resistance in addition to being highly extensible. Water-borne coatings based on polyurethanes of this type have excellent hydrolytic stability.

SUMMARY OF THE INVENTION

The invention relates to a coating composition consisting essentially of (A) a urethane reaction product of a diisocyanate and a polyester polyol wherein the polyester polyol is formed from
  (1) an alcohol component having an average functionality of at least 2.0, and
  (2) an acid component consisting essentially of dimer acid
said urethane reaction product having a hydroxyl value of at least 10; and
(B) an aminoplast resin.

An especially preferred embodiment relates to the formation of the urethane reaction product wherein the urethane is formed with an excess of a diisocyanate and the urethane reaction product is capped with an excess of a multi-functional alcohol having a functionality of 2 or more.

The dimer acid based polyester is preferably formed from an alcohol component having an average functionality of at least about 2.0 and the acid component consists essentially of dimer acid. The weight percent of dimer acid found useful is from 60-100% of the acid component. The remaining 0-40% of the acid component consists of a monomeric carboxylic acid or anhydride having up to 16 carbon atoms.

Such coatings are especially useful on virtually any elastomeric substrate and are especially useful on rubber, resilient substrates such as polyurethane or polyethylene foam, natural or synthetic rubber or rubber foam, and various elastomeric plastic materials. They are also particularly useful on other substrates such as mild steel or aluminum.

The composition of the glycol-acid mixture employed is such as to provide an excess of at least 2 equivalents of the glycol over and above the total number of equivalents of acid present in the mixture. In other words, the reactants should be so selected, and the stoichiometric proportions of the respective acid and polyol reactants be so adjusted, as to give hydroxy-terminated, polyester molecules each theoretically having a hydroxyl functionality of 2 or more. When monobasic acids are employed in the acid mixture, it is necessary to employ at least one mol of a triol for each mol of monobasic acid used if a product of the desired hydroxy-terminated structure is to be obtained.

As stated above, the acid mixture employed in forming the polyester intermediate contains the $C_{36}$ dicarboxylic acid product known as dimer acid. Processes for forming this acid are well known and form the subject of numerous U.S. patents including Nos. 2,482,761, 2,793,220, 2,793,221 and 2,955,121. In carrying out said dimer-forming operations, unsaturated fatty acids such as oleic, linoleic and linolenic acid, or mixtures of such acids (usually admixed with saturated fatty acids), all of essentially $C_{18}$ chain length, are heated in the presence of water, or in the presence of both water and an active clay mineral, to induce polymerization. The polymeric fatty acid reaction mixtures so prepared contain from about 30 to 75%, by weight of acid polymer, with the balance of the mixture representing $C_{18}$ monocarboxylic (monomer) acids of one type or another which are distilled from the mixture once the polymerization operation is concluded. If desired, the non-polymerized $C_{18}$ acids so recovered can be employed as the monocarboxylic acid component of the acid mixture reacted with the polyol to form the polyester intermediate. The residual polymer fraction consists essentially of dimer ($C_{36}$ dicarboxylic acids) together with amounts up to about 20-22% of $C_{54}$ trimer. However, the trade customarily refers to this dimer-trimer mixture as "dimer", and this practice is followed herein. The preferred grade contains 97% dimer and 3% trimer. These polymerization reaction products can be used in the form in which they are recovered from the polymerization unit, or they can be given a partial or complete hydrogenation treatment to reduce unsaturation before being reacted with the polyol compound to form the polyester. This is also true for the monomeric portion of the product in case the same is to be employed in forming the polyester. Polyesters so formed can then be used to form a polyurethane according to this invention. The polyurethane so produced has been found to provide highly extensible coating compositions.

These compositions, although based on a urethane system, are distinguished from ordinary polyurethanes because they are both storage-stable in one package and yet form a cross-linked thermoset cured coating.

The coatings herein provide all the above-mentioned properties to a satisfactory degree and have a combination of these properties not heretofore considered possible.

DETAILED DESCRIPTION OF THE INVENTION

The invention relates to a coating composition consisting essentially of (A) a urethane reaction product of a diisocyanate and a polyester polyol wherein the polyester polyol is formed from
  (1) an alcohol component having an average functionality of at least 2.0, and
  (2) an acid component consisting essentially of dimer acid,
  said urethane reaction product having a hydroxyl value of at least 10; and
(B) an aminoplast resin.

An especially preferred embodiment relates to the formation of the urethane reaction product wherein the urethane is formed with an excess of a diisocyanate and the urethane reaction product is capped with an excess of a multi-functional alcohol having a functionality of 2 or more.

It is necessary that the polyester employed have certain properties in order to provide a coating of the desired characteristics. These properties are obtained in general by utilizing a polyester containing a multi-functional alcohol component having an average functionality of at least about 2.0. The polyester polyol in most cases consists essentially of one or more diols with up to about 25 mole percent of a multi-functional alcohol present having 3 or more hydroxyl groups. While it is not always necessary to have a triol or higher multi-functional alcohol present, some branching is desirable, although the polyester should not be highly branched. There may also be present a small amount of monoalcohol, particularly if larger proportions of higher functional alcohols are used. In certain instances, such as where very high molecular weight polyols are used, the polyols can be largely or even entirely made up of compounds of functionality higher than two.

The diols which are usually employed in making the polyester include alkylene glycols, such as ethylene glycol, propylene glycol, butylene glycol, and neopentyl glycol, and other glycols such as hydrogenated bisphenol A, cyclohexane dimethanol, caprolactone diol (i.e., the reaction product of caprolactone and ethylene glycol), hydroxyalkylated bisphenols, polyether glycols, e.g. poly (oxytetramethylene) glycol, and the like. However, other diols of various types and, as indicated, polyols of higher functionality can also be utilized. Such higher functional alcohols can include, for example, trimethylolpropane, trimethylolethane, pentaerythritol, and the like, as well as higher molecular weight polyols such as those produced by oxyalkylating lower molecular weight polyols. An example of such a higher molecular weight polyol is the reaction product of 20 moles of ethylene oxide or propylene oxide per mole of trimethylolpropane.

The acid component of the polyester is critical to the invention and consists essentially of dimer acid. By this I mean that the acid component of the polyester must be at least 60% by weight dimer acid. The remaining 0–40 weight % of the acid component consists of a monomeric carboxylic acid or anhydride having up to 16 carbon atoms. The especially preferred acid component is 100 weight % dimer acid. The polyester is produced using conventional techniques, with the reaction conditions and the ratio of reactants chosen so as to provide a product having residual hydroxyl groups, i.e., a polyester polyol. The number of hydroxyls present in the polyester polyol can be varied, but it is preferred that its hydroxyl value be at least about 30 and preferably from about 40 to about 110. The molecular weight of the polyester polyol has been found to be from about 1000 to 4000 and most preferably from about 1200 to 2500.

The polyester polyol as described provides the major portion of the polyhydric material and may be the entire polyhydric component utilized in the preparation of the polyurethane. However, in many cases other hydroxyl containing compounds are used.

The polyhydric material can be either low or high molecular weight and preferably includes a mixture of the two and in general will have average hydroxyl values as determined by ASTM designation E-222-67, Method B, between about 1000 and 10, and preferably between about 500 and 50.

The low molecular weight diols useful in the instant invention are known in the art. They have hydroxy values of 200 or above, usually within the range of 1500 to 200. Such materials include aliphatic diols, particularly alkylene polyols containing from 2 to 18 carbon atoms. Examples include ethylene glycol, 1,4-butanediol, 1,6-hexanediol, cycloaliphatic diols such as 1,2 cyclohexanediol and cyclohexane dimethanol.

The most suitable polymeric polyols include polyalkylene ether polyols including thio ethers, polyester polyols including polyhydroxy polyesteramides and hydroxyl-containing polycaprolactones.

The higher polymeric polyol component is preferably combined with low molecular weight polyol described above. It has been found that by blending high and low molecular weight polyols, optimum properties can be obtained in the resultant polyurethane. Preferably, the polymeric polyol is the major component, being present in an amount of about 25 to 95 percent by weight based on total weight of the polyol used to prepare the polyurethane, the remainder being low molecular weight diol.

The organic diisocyanate which is reacted with the polyhydric material as described is essentially any diisocyanate, e.g. hydrocarbon diisocyanates or substituted hydrocarbon diisocyanates. Many such organic diisocyanates are known in the art, including p-phenylene diisocyanate, biphenyl 4,4′diisocyanate, toluene diisocyanate, 3,3′-dimethyl-4,4 biphenylene diisocyanate, 1,4-tetramethylene diisocyanate, 1,6-hexamethylene diisocyanate, 2,2,4-trimethylhexane-1,6 diisocyanate, methylene bis (phenyl isocyanate), 1,5 naphthalene diisocyanate, bis (isocyanatoethyl fumarate), isophorone diisocyanate (IPDI) and methylene -bis-(4 cyclohexylisocyanate). There can also be employed isocyanate-terminated adducts of diols, such as ethylene glycol, 1,4-butylene glycol, polyalkylene glycols, etc. These are formed by reacting more than one more of a diisocyanate, such as those mentioned, with one mole of a diol to form a longer chain diisocyanate. Alternatively, the diol can be added along with the diisocyanate.

While diisocyanates are preferred, other multi-functional isocyanates can be utilized. Examples are 1,2,4-benzene triisocyanate and polymethylene polyphenyl isocyanate.

It is preferred to employ an aliphatic diisocyanate, since it has been found that these provide better color stability in the finished coating. Examples include 1,6-hexamethylene diisocyanate, 1,4-butylene diisocyanate, methylene bis (4-cyclohexyl isocyanate) and isophorone diisocyanate. Mixtures of diisocyanates can also be employed. The proportions of the diisocyanate and the polyester are chosen so as to provide a hydroxyl-containing product. This can be accomplished by utilizing a less than stoichiometric amount of polyisocyanate, i.e., less than one isocyanate group per hydroxyl and carboxyl group in the polyester. Higher (e.g. stoichiometric or excess) isocyanate levels can be present if the reaction is terminated at the desired stage, as by addition of a compound which reacts with the residual isocyanate groups: water, alcohols and amino alcohols are examples of such compounds.

In one especially desirable embodiment of the invention, a multi-functional alcohol is used to terminate the reaction at the desired stage (determined by the viscosity), thereby also contributing residual hydroxyl groups. Particularly desirable for such purposes are aminoalcohols, such as ethanolamine, diethanolamine and the like, since the amino groups preferentially react with the isocyanate groups present. Multi-functional alcohols, such as ethylene glycol, trimethylolpropane and hydroxyl-terminated polyesters, can also be employed in this manner.

While the ratios of the components of the polyester, the multi-functional isocyanate and any terminating agent can be varied, it will be noted by those skilled in the art that the amounts should be chosen so as to avoid gellation and to produce an ungelled, urethane reaction product containing hydroxyl groups. The hydroxyl value of the urethane reaction product should be at least 10 and preferably 20 to about 200.

It may be necessary to build acid groups into the polyurethane. For example, the presence of acid groups is capable of rendering the composition water dilutable.

The acids that are employed in the invention are readily available. They can be prepared from an aldehyde that contains at least two hydrogens in the alpha position. Such aldehydes are reacted in the presence of a base catalyst with two equivalents of formaldehyde to form a 2.2-hydroxymethyl aldehyde. The aldehyde is then gently oxidized to the acid by known procedures. The acids that are employed in the invention can be represented in simplification by Formula I:

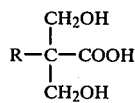

wherein R represents hydroxymethyl, hydrogen, or alkyl of up to 20 carbon atoms and preferably up to 8 carbon atoms.

Specific illustrative examples of acids that are employed in the invention include 2,2-di (hydroxymethyl) acetic acid, 2,2.2-tri (hydroxymethyl) acetic acid, 2,2-di (hydroxymethyl) propionic acid, 2,2-di (hydroxymethyl) butyric acid, 2,2-di (hydroxymethyl) pentanoic acid, and the like. The preferred acid is 2,2-di (hydroxymethyl) propionic acid.

Besides acid salt groups which are anionic and are preferred, the polyurethane can contain cationic salt groups. The polyurethane can be prepared with reactants containing the cationic salt group, or as is more normally the case, polyurethanes containing suitable precursors can be converted to the cationic salt by adding a neutralizing agent to the polymer. Compounds which contain at least one hydrogen atom reactive with the isocyanate and at least one group capable of cationic salt formation can be used.

Examples of classes of materials which can be used are the following: compounds which have acid neutralized primary or secondary amino groups; basic tertiary amino groups: tertiary phosphino groups which can be neutralized with acid or quaternized with quaternizing agents; compounds which contain halogen atoms capable of quaternizing reactions; compounds which contain epoxy groups which are reactive with acid plus amines or phosphines to form acid salt or quaternary groups, and which are reacted with acids plus sulfides to form acid salts or ternary sulfonium groups.

The urethane reaction product as described above is mixed with an aminoplast resin to provide the coating composition. Aminoplast resins are aldehyde condensation products of melamine, urea, and similar compounds; products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine acetoguanamine, ammeline, 2-chloro-4,6-diamino-1,3,5-triazine, 6-methyl-2,4-diamino-1,3,5-triazine, 3-5-diamino-triazole, triaminopyrimidine, 2-mercapto-4,6-diaminopyrmidine, 2,4,6-triethyl trianimo-1,3,5-triazine, and the like.

While the aldehyde employed is most often formaldehyde, other similar condensation products can be made from other aldehydes, such as acetaldehyde, crotonaldehyde acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, hepanol and others, as well as benzyl alcohol and other aromatic alcohols, cyclic alcohol such as cyclohexanol, monoethers or glycols such as Cellosolves and Carbitols, and halogen-substituted or other substituted alcohols, such as 3-chloropropanol. The preferred amine-aldehyde resins are etherified with methanol or butanol.

The proportions of the above components can be varied to provide certain properties. The amounts employed depend in large part upon the nature of the particular components, e.g., the specific polyester, aminoplast resin, as well as the type of polymeric polyol, if any, employed. In most cases the overall composition contains from about 50 to about 95 percent by weight of urethane reaction product, and from about 5 to about 50 percent of aminoplast resin. The preferred compositions in which a polymeric polyol is included contain from about 40 to about 90 percent by weight of urethane reaction product, from about 5 to about 40 percent by weight of aminoplast resin, and from about 5 to about 20 percent by weight of polymeric polyol.

In addition to the components above, paint compositions ordinarily contain various pigments; and any of the pigments ordinarily utilized in automotive paints can be used. In addition, various fillers, plasticizers, antioxidants, flow control agents, surfactants and other such formulating additives are employed in many instances. The composition is ordinarily contained in a solvent, which can be any solvent or solvent mixture in which the materials employed are compatible and soluble to the desired extent.

The compositions herein can be applied by any conventional method, including brushing, dipping, flow coating, etc., but paint compositions for autos and the like are most often applied by spraying. Usual spray techniques and equipment are utilized. They can be applied over virtually any substrate, including wood, metals, glass, cloth, plastics, foams, and the like, as well as over various primers.

The coatings are cured at elevated temperatures. In most cases the cure schedule is from about 20 to about 40 minutes at 140° F. to 260° F. Higher or lower temperatures with correspondingly shorter and lower times can be utilized, although the exact cure schedule best employed depends in part upon the nature of the substrate as well as the particular components of the composition. Acid catalysts and other curing catalysts can be added to aid in curing if desired; these can permit the use of lower temperatures and/or shorter times.

The invention will be further described in connection with several examples which follow. These examples are given as illustrative of the invention and are not to be construed as limiting it to their details. All parts and percentages in the examples and throughout the specification are by weight unless otherwise indicated.

EXAMPLE I

The following were charged to a reaction vessel:

|  | Parts by Weight |
|---|---|
| Dimer Acid | 3407 |
| Neopentyl Glycol | 588 |
| Cyclohexane dimethanol | 439 |
| Toluene | 112 |

The mixture was heated in a nitrogen atmosphere and the water of condensation removed. Heating was continued to ~230° C. until an acid value of <7 and a hydroxyl value of about 55 was obtained. The product was then vacuum stripped at about 175° C. to remove toluene and any residual water. The polyester produced was reacted as follows:

|  | Parts by Weight |
|---|---|
| Polyester (prepared above) | 1694.0 |
| Dimethylol propionic acid | 160.8 |
| Methylene-bis(4-cyclohexyl-isocyanate) | 630.0 |
| Methyl n-amyl ketone | 779.0 |

The above was heated to 95° C. and held until a constant isocyanate value was obtained (about 2 hours), at which time 118 parts of trimethylol propane was added and the reaction continued an additional one hour at 95° C. The urethane reaction product was then diluted with 250 parts each of toluene, n propyl alcohol and methyl ethyl ketone. The resultant urethane reaction product had a Brookfield viscosity at 25° C. of 235 poise and contained 63.6 percent total solids.

EXAMPLE II

A polyester containing 60 mole percent dimer acid as the diacid component was prepared from the following:

|  | Parts by Weight |
|---|---|
| Dimer acid | 2664 |
| Azelaic acid | 568 |
| Neopentyl glycol | 693 |
| Cyclohexane dimethanol | 518 |
| Toluene | 104 |

The polyester was prepared as in Example I and had an acid value of 6.7 and a hydroxyl value of about 50. The above polyester was reacted with the following:

|  | Parts by Weight |
|---|---|
| Polyester | 1671 |
| Dimethylol propionic acid | 169 |
| Methylene-bis(4-cyclohexyl-isocyanate) | 667 |
| Methyl n-amyl ketone | 786 |

The mixture was heated at 95° C. for about 3 hours at which time 124 parts of trimethylol propane was added and the reaction continued an additional one hour at 95°–100° C. The urethane reaction product was then diluted with 250 parts of n-propyl alcohol, 250 parts of toluene and 250 parts of methyl ethyl ketone. The product had a Brookfield viscosity @ 25° C. of 167 poise, an acid value of 18 and contained 63 percent total solids.

EXAMPLE III

A white paint coating composition was prepared using the urethane reaction product described in Example I. The coating composition contained the following:

|  | Parts by Weight |
|---|---|
| Urethane reaction product (from Example I) | 149.2 |
| Methylated melamine-formaldehyde resin (90%) (Cymel 327) | 36.6 |
| Cellosolve Acetate | 48.3 |
| Toluene | 48.3 |
| n-butyl alcohol | 70.0 |
| Pigment paste | 149.2 |

The formulated coating composition was reduced to a spray viscosity of 22 seconds Zahn #2 cup by the addition of 120 parts of a toluene/cellosolve acetate 1/1 mixture.

The pigment paste employed was prepared by mixing the following and grinding in a ball mill for 20 hours.

|  | Parts by Weight |
|---|---|
| Urethane reaction product (Example I) | 157.2 |

|                   | Parts by Weight |
|-------------------|-----------------|
| $TiO_2$           | 340.0           |
| Toluene           | 107.8           |
| Cellosolve Acetate| 71.9            |

The paste had a percent total solids of 65 and contained 50.2 percent $TiO_2$ and 14.8 percent urethane.

EXAMPLE IV

A white coating composition was prepared similar to Example III except using the urethane reaction product from Example II. The coating composition contained the following:

|                                                  | Parts by Weight |
|--------------------------------------------------|-----------------|
| Urethane reaction product (from Example II)      | 150.8           |
| Methylated melamine formaldehyde resin (90%) (Cymel 327) | 36.6    |
| Cellosolve Acetate                               | 47.4            |
| Toluene                                          | 47.4            |
| n-butyl alcohol                                  | 68.6            |
| Pigment paste                                    | 149.2           |

The formulated coating composition was reduced to a spray viscosity of 22 seconds Zahn #2 cup by the addition of 110 parts of a toluene/cellosolve acetate 1/1 mixture.

The pigment paste employed was prepared by mixing the following and grinding in a ball mill for 20 hours.

|                                      | Parts by Weight |
|--------------------------------------|-----------------|
| Urethane reaction product (Example II)| 158.7          |
| $TiO_2$                              | 340.0           |
| Toluene                              | 106.9           |
| Cellosolve acetate                   | 71.3            |

The paste had a percent total solids of 65 and contained 50.2 percent $TiO_2$ and 14.8 percent urethane.

EXAMPLE V

Coating compositions prepared in Examples III and IV were sprayed onto metal as well as thermoplastic polyurethane substrates. The metal substrate was a cold rolled steel, Bonderite 40 treatment (Parker Test panel). The panels were used without any primer or surface treatment. The flexible substrate was a thermoplastic polyurethane panel (TPU) obtained from Allmand Associates, Livonia, Mich. The TPU panel was rinsed with toluene to remove any surface grease.

The coating compositions were sprayed onto the above substrates, then allowed to stand at room temperature for 10 minutes, followed by curing for 10 minutes at 150° F., then 30 minutes at 250° C.

The resulting finishes had good gloss (20° gloss of about 80-83) and the finish had excellent resistance to cracking and chipping from the TPU substrate at both room temperature and at −20° F. The coatings on the TUP panels were unaffected after 96 hours of exposure at 100° F./100% RH and 10 days water soak. Resistance to solvents (methyl ethyl ketone and unleaded gasoline) was also good.

EXAMPLE VI

A clear water-dilutable urethane coating was prepared as follows:

|                            | Parts by Weight |
|----------------------------|-----------------|
| Polyester (from Example I) | 571.6           |
| Dimethylol propionic acid  | 54.3            |
| Methyl n-amyl ketone       | 180.7           |
| Isophorone diisocyanate    | 197.1           |

The above items were mixed and heated at 95° C. for about 2½ hours or until a constant isocyanate value was reached, at which time 59.7 parts of Trimethylolpropane was added and the reaction continued an additional one hour at 97°-100° C. The resulting urethane reaction product was then neutralized and diluted with water by mixing 1063 parts of the urethane with 25.2 parts of dimethyl ethanolamine dispersed in 113 parts of Butyl Cellosolve followed by dispersing with 1310 parts of water. The resulting was dilutable polyurethane had a pH of 6.8, a Brookfield viscosity of 1075 centipoise at 25° C. and contained 34.9 percent total solids.

EXAMPLE VII

Twenty-five (25) percent by weight total resin solids of a methylated melamine-formaldehyde curing agent (Cymel 327) was added to the water dilutable urethane reaction product from Example VI to form a clear crosslinked coating vehicle. The coating composition was deposited on a thermoplastic polyurethane panel (TPU), using a number 70 wire wound bar. The film was cured 30 minutes at 250° F. resulting in a tough, flexible, solvent resilient (methyl ethyl ketone) high gloss finish.

As a typical comparison, U.S. Pat. No. 3,954,899, Example 7, describes a water dilutable polyurethane reaction product. The above urethane was prepared according to the teachings in the patent, then blended with 25 weight percent of a methylated melamine formaldehyde resin (MM-83). The crosslinkable coating composition was applied to a TPU panel and cured as above. The resulting coating had very poor solvent (methyl ethyl ketone) resistance and was very brittle as evidenced by the coating cracking and chipping from the substrate after it has been flexed.

I claim:
1. A coating composition consisting essentially of
(A) a urethane reaction product of a diisocyanate and a polyester polyol wherein the polyester polyol has a molecular weight of from about 1200 to about 2500 and is formed from
   (1) an alcohol component having an average functionality of at least 2.0, and
   (2) an acid component consisting essentially of dimer acid
said urethane reaction product having a hydroxyl value of at least 10; and
(B) an aminoplast resin.
2. The coating composition of claim 1 wherein said urethane reaction product is formed with an excess of a diisocyanate and the urethane reaction product is capped with an excess of a multi-functional alcohol having a functionality of 2 or more.
3. A coating composition consisting essentially of
(A) a urethane reaction product of a diisocyanate and a polyester polyol wherein the polyester polyol has a molecular weight of from about 1200 to about 2500 and is formed from
(1) an alcohol component having an average functionality of at least 2.0, and
(2) an acid component of 100% dimer acid
said urethane reaction product having a hydroxyl value of at least 10; and
(B) an aminoplast resin.

4. The coating composition of claim 1 wherein the acid component is at least 60 weight percent dimer acid.

5. The coating composition of claim 1 wherein the diisocyanate is an aliphatic diisocyanate.

6. The coating composition of claim 1 wherein the diisocyanate is a mixture of diisocyanates.

7. The coating composition of claim 1 wherein the acid component is 60–100 weight percent dimer acid and 0–40 weight percent of a monomeric carboxylic acid or anhydride having up to 16 carbon atoms.

8. A coated article comprising
(A) a substrate and as a coating thereon
(B) a coating composition consisting essentially of
(1) a urethane reaction product of a diisocyanate and a polyester polyol wherein the polyester polyol has a molecular weight of from about 1200 to about 2500 and is formed from
(a) an alcohol component having an average functionality of at least 2.0, and
(b) an acid component consisting essentially of dimer acid
said urethane reaction product having a hydroxyl value of at least 10; and
(2) an aminoplast resin.

9. The coated article of claim 8 wherein the said urethane reaction product is formed with an excess of a diisocyanate and the urethane reaction product is capped with an excess of a multi-functional alcohol having a functionality of 2 or more.

10. The coated article of claim 8 wherein the substrate is elastomeric.

11. The coated article of claim 8 wherein the coating used is pigmented.

12. The coated article of claim 8 wherein the acid component is at least 60 weight percent dimer acid.

13. The coated article of claim 8 wherein the acid component is 60–100 weight percent dimer acid and 0–40 weight percent of a monomeric carboxylic acid or anhydride having up to 16 carbon atoms.

14. A paint composition comprising
(A) a coating composition consisting essentially of
(1) a urethane reaction product of a diisocyanate and a polyester polyol wherein the polyester polyol has a molecular weight of from about 1200 to about 2500 and is formed from
(a) an alcohol component having an average functionality of at least 2.0, and
(b) an acid component consisting essentially of dimer acid
said urethane reaction product having a hydroxyl value of at least 10 and containing anionic salt groups; and
(2) an aminoplast resin, and
(B) pigment.

15. The paint composition according to claim 14 wherein the urethane reaction product is formed with an excess of a diisocyanate and the urethane reaction product is capped with an excess of a multi-functional alcohol having a functionality of 2 or more.

16. A paint composition comprising
(A) a coating composition consisting essentially of
(1) a urethane reaction product of a diisocyanate and a polyester polyol wherein the polyester polyol has a molecular weight of from about 1200 to about 2500 and is formed from
(a) an alcohol component having an average functionality of at least 2.0, and
(b) an acid component consisting essentially of dimer acid
said urethane reaction product having a hydroxyl value of at least 10;
(2) an aminoplast resin,
(B) pigment, and
(C) organic diluent present in an amount sufficient to reduce the paint composition viscosity for coating applications.

17. The paint composition according to claim 16 wherein the urethane reaction product is formed with an excess of a diisocyanate and the urethane reaction product is capped with an excess of a multi-functional alcohol having a functionality of 2 or more.

* * * * *